(12) United States Patent
Corfield

(10) Patent No.: US 9,685,154 B2
(45) Date of Patent: Jun. 20, 2017

(54) APPARATUS AND METHODS FOR MANAGING RESOURCES FOR A SYSTEM USING VOICE RECOGNITION

(71) Applicant: nVoq Incorporated, Boulder, CO (US)

(72) Inventor: Charles Corfield, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 130 days.

(21) Appl. No.: 14/035,641

(22) Filed: Sep. 24, 2013

(65) Prior Publication Data

US 2014/0088962 A1 Mar. 27, 2014

Related U.S. Application Data

(60) Provisional application No. 61/705,320, filed on Sep. 25, 2012.

(51) Int. Cl.
| | |
|---|---|
| *G10L 15/14* | (2006.01) |
| *G10L 15/06* | (2013.01) |
| *G10L 15/26* | (2006.01) |
| G10L 15/07 | (2013.01) |
| G10L 15/01 | (2013.01) |
| G10L 15/065 | (2013.01) |

(52) U.S. Cl.
CPC ............ *G10L 15/063* (2013.01); *G10L 15/26* (2013.01); *G10L 15/01* (2013.01); *G10L 15/065* (2013.01); *G10L 15/07* (2013.01)

(58) Field of Classification Search
CPC combination set(s) only.
See application file for complete search history.

(56) References Cited

U.S. PATENT DOCUMENTS

| | | | |
|---|---|---|---|
| 4,817,156 A | | 3/1989 | Bahl et al. |
| 4,866,778 A | | 9/1989 | Baker |
| 5,027,406 A | | 6/1991 | Roberts et al. |
| 5,488,652 A | | 1/1996 | Bielby et al. |
| 5,809,462 A | | 9/1998 | Nussbaum |
| 5,963,903 A | * | 10/1999 | Hon ............ G10L 15/063 704/240 |
| 6,092,043 A | | 7/2000 | Squires et al. |
| 6,122,614 A | * | 9/2000 | Kahn et al. .......... 704/235 |
| 6,343,270 B1 | | 1/2002 | Bahl et al. |
| 6,366,882 B1 | * | 4/2002 | Bijl et al. .......... 704/235 |
| 6,507,816 B2 | * | 1/2003 | Ortega ............ 704/235 |
| 6,832,189 B1 | * | 12/2004 | Kanevsky et al. ........ 704/235 |
| 7,177,801 B2 | * | 2/2007 | Krasnanski et al. ........ 704/201 |
| 7,346,507 B1 | | 3/2008 | Natarajan et al. |

(Continued)

OTHER PUBLICATIONS

International Search Report and Written Opinion for International Application No. PCT/US13/61450, mailed Apr. 10, 2014. 10 pages.

*Primary Examiner* — Richard Zhu
(74) *Attorney, Agent, or Firm* — Perkins Coie LLP

(57) ABSTRACT

The technology of the present application provides a method and apparatus to managing resources for a system using voice recognition. The method and apparatus includes maintaining a database of historical data regarding a plurality of users. The historical database maintains data regarding the training resources required for users to achieve an accuracy score using voice recognition. A resource calculation module determines from the historical data an expected amount of training resources necessary to train a new user to the accuracy score.

1 Claim, 8 Drawing Sheets

(56) References Cited

U.S. PATENT DOCUMENTS

| | | |
|---|---|---|
| 7,668,710 B2 * | 2/2010 | Doyle ................................ 704/9 |
| 7,873,522 B2 * | 1/2011 | Du et al. ........................ 704/275 |
| 7,962,331 B2 | 6/2011 | Miller et al. |
| 8,041,565 B1 * | 10/2011 | Bhardwaj et al. ............. 704/235 |
| 8,515,745 B1 * | 8/2013 | Garrett .............. G06F 17/30976 |
| | | 704/231 |
| 2002/0114429 A1 | 8/2002 | Engelke et al. |
| 2002/0169605 A1 * | 11/2002 | Damiba et al. ............... 704/235 |
| 2004/0236581 A1 | 11/2004 | Ju et al. |
| 2008/0076106 A1 | 3/2008 | Collier |
| 2008/0103868 A1 * | 5/2008 | Santos ................... G06Q 10/06 |
| | | 705/7.14 |
| 2008/0249773 A1 | 10/2008 | Bejar et al. |
| 2008/0300844 A1 * | 12/2008 | Bagchi et al. ................... 703/13 |
| 2009/0292538 A1 | 11/2009 | Barnish |
| 2010/0204989 A1 | 8/2010 | Boes et al. |
| 2011/0264451 A1 | 10/2011 | Hoepfinger et al. |
| 2012/0078669 A1 | 3/2012 | Harkins et al. |
| 2012/0082961 A1 | 4/2012 | Margiotta |
| 2012/0150761 A1 | 6/2012 | Ananian |
| 2012/0185250 A1 | 7/2012 | Beach et al. |

\* cited by examiner

APPARATUS AND METHODS FOR MANAGING RESOURCES FOR A SYSTEM USING VOICE RECOGNITION

CLAIM OF PRIORITY UNDER 35 U.S.C. §§119 AND 120

The present application claims priority to U.S. Patent Application 61/705,320, filed Sep. 25, 2012, which application is incorporated hereby reference as if set out in full.

REFERENCE TO CO-PENDING APPLICATIONS FOR PATENT

None.

BACKGROUND

Field

The technology of the present application relates generally to speech recognition systems, and more particular, to apparatuses and methods to allow for determining training resources in a speech to text center.

Background

Natural language or continuous speech recognition and speech to text engines are becoming ubiquitous for the generation of text from user audio. Exemplary natural language speech to text engines are available from companies such as Microsoft, Inc., International Business Machine Company, and Nuance, Inc. to name but three exemplary companies with speech recognition engines. The recognized text may be used to generate word documents, such as, for example, this patent application, or populate fields in a user interface, database, or the like, such as, for example, the data fields in a customer relationship management application usable with a call center. The use of speech recognition in applications, such as, for example, customer relationship management applications, legal applications, accounting applications, and medical applications is particularly beneficial as those services generally are document intensive and the service providers are rarely experts in typing or the like.

The focus of natural language systems is to match the utterance to a likely vocabulary and phraseology and determine how likely the sequence of language symbols would appear in speech. Determining the likelihood of a particular sequence of language symbols is generally called a language model. The language model provides a powerful statistical model to direct a word search based on predecessor words for a span of n words. Thus, the language model will use probability and statistically more likely for words with similar utterances. For example, the words "see" and "sea" are pronounced substantially the same in the United States of America. Using a language model, the speech recognition engine would populate the phrase: "Ships sail on the sea" correctly because the probability indicates the word "sea" is more likely to follow the earlier words in the sentence. The mathematics behind the natural language speech recognition system are conventionally known as the hidden Markov model. The hidden Markov model is a system that predicts the value of the next state based on the previous states in the system and the limited number of choices available. The details of the hidden Markov model are reasonably well known in the industry of speech recognition and will not be further described herein.

Conventionally, the speech recognition systems are machine specific. The machine includes the language model, speech recognition engine, and user profile for the user (or users) of the machine. These conventional speech recognition engines may be considered thick or fat clients where a bulk of the processing is accomplished on the local machine. More recently, companies such as nVoq located in Boulder, Colo., have developed technology to provide a distributed speech recognition system using the Cloud. In these cases, the audio file of the user is streamed or batched to a remote processor from a local device. The remote processor performs the conversion (speech to text or text to speech) and returns the converted file to the user. For example, a user at a desktop computer may produce an audio file that is sent to a text to speech device that returns a Word document to the desktop. In another example, a user on a mobile device may transmit a text message to a speech to text device that returns an audio file that is played through the speakers on the mobile device.

While dictation to generate text for documents, a clipboard, or fields in a database are reasonably common, they all suffer from the same drawback in that the most robust systems require the speech to text engine to be trained to the individual using the speech to text engine. The initial training of a natural language speech recognition engine generally uses a number of "known" words and phrases that the user dictates. The statistical algorithms are modified to match the user's speech patterns. Subsequent modifications of the speech recognition engine may be individualized by corrections entered by a user to transcripts when the transcribed speech is returned incorrect.

While significantly more robust, natural language speech recognition engines generally require training to a particular user's speech patterns, dialect, etc., to function properly. The training is often time consuming and tedious. However, natural language speech recognition engines that are not properly trained frequently operate with mistakes causing frustration and inefficiency for the users. In some cases, this may lead to the user discontinuing the implementation of the natural language speech recognition engine. Thus, many industries seeking to use speech recognition need to determine training programs to provide sufficient training (both of the speech recognition engine as well as the individual using the speech recognition engine) such that the system is used properly to avoid frustration and inefficiencies but not too much training, which is time consuming, tedious, and a waste of scarce resources. Conventionally, speech recognition engine training is pursuant to an accepted protocol. However, little regard is given for sufficient training to provide an acceptable level of accuracy.

Thus, against this background, it is desirable to develop improved apparatuses and methods for managing resources for a system using voice recognition.

SUMMARY

To attain the advantages, and in accordance with the purpose of the technology of the present application, methods and apparatus to determine training resources in a speech to text center are provided. In particular, the method, apparatus, and system receives data regarding a plurality of speech recognition engine users, where the data includes the training completed for any individual user and the accuracy of the user through the training. The method, apparatus, and system determines from the data the percentage of users that will be adequately trained after a prescribed amount of training. In one aspect of the technology of the present application, the prescribed amount of training is the amount of time the user is in the prescribed training. In another aspect of the technology of the present application, the prescribed amount of training is the number of training modules completed (which training modules may be reading, comparing, and determining the accuracy of known or true text). In still other aspects of the technology of the present application, the prescribed amount of training may be a combination of different training techniques including time on task, number of modules, or the like.

In one aspect of the technology of the present application, the information regarding the number of users that will be adequately trained after a prescribed amount of training may be used to determine staffing needs, work force size, and ensure a sufficient number of users are in training to account for expected attritions and the like.

In another aspect of the technology of the present application, the speech recognition system may provide a status of training for an individual user on the user's interface. For example, the display may provide an indication of unacceptable accuracy, approaching acceptable accuracy, or achieved acceptable accuracy such that the individual user can monitor the training status. The indication may be a chart, graph, color code, number, or the like. When acceptable training has been achieved, the indication may include both a visual and an auditory alert.

In certain aspects of the technology of the present application, the speech recognition system is implemented using a thin client where the user interface is provided at a workstation and the speech recognition and evaluation is completed remotely. In other aspects of the technology of the present application, the speech recognition system is implemented using a thick or fat client where the user interface and the application are resident on a client workstation.

In certain aspects of the technology of the present application, the information provided to the user may be an estimated time to completion of the training. In certain aspects, the estimate may be a representation such as, for example, a certain percentage of users are trained after a prescribed number of minutes. In other aspects, the estimate may be a representation that users at a level of accuracy of X achieve a level of accuracy Y after a certain amount of training.

In certain aspects of the technology, the speech recognition engine is a natural language or continuous speech recognition engine. In other aspects of the technology, the speech recognition engine is a grammar or pattern match speech recognition engine. In still other aspects of the technology, the speech recognition engine uses multiple types of recognition engines.

In other aspects, the methods and apparatuses may be useful in identification of remedial measure for users. In certain aspects, the remedial measures may be the user did not achieve a predetermined accuracy after a prescribed amount of training. In other aspects, the remedial measures may be the user did not achieve a sufficient amount of increased accuracy given the amount of training.

The foregoing and other features, utilities and advantages of the invention will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

DETAILED DESCRIPTION

Figure 1:
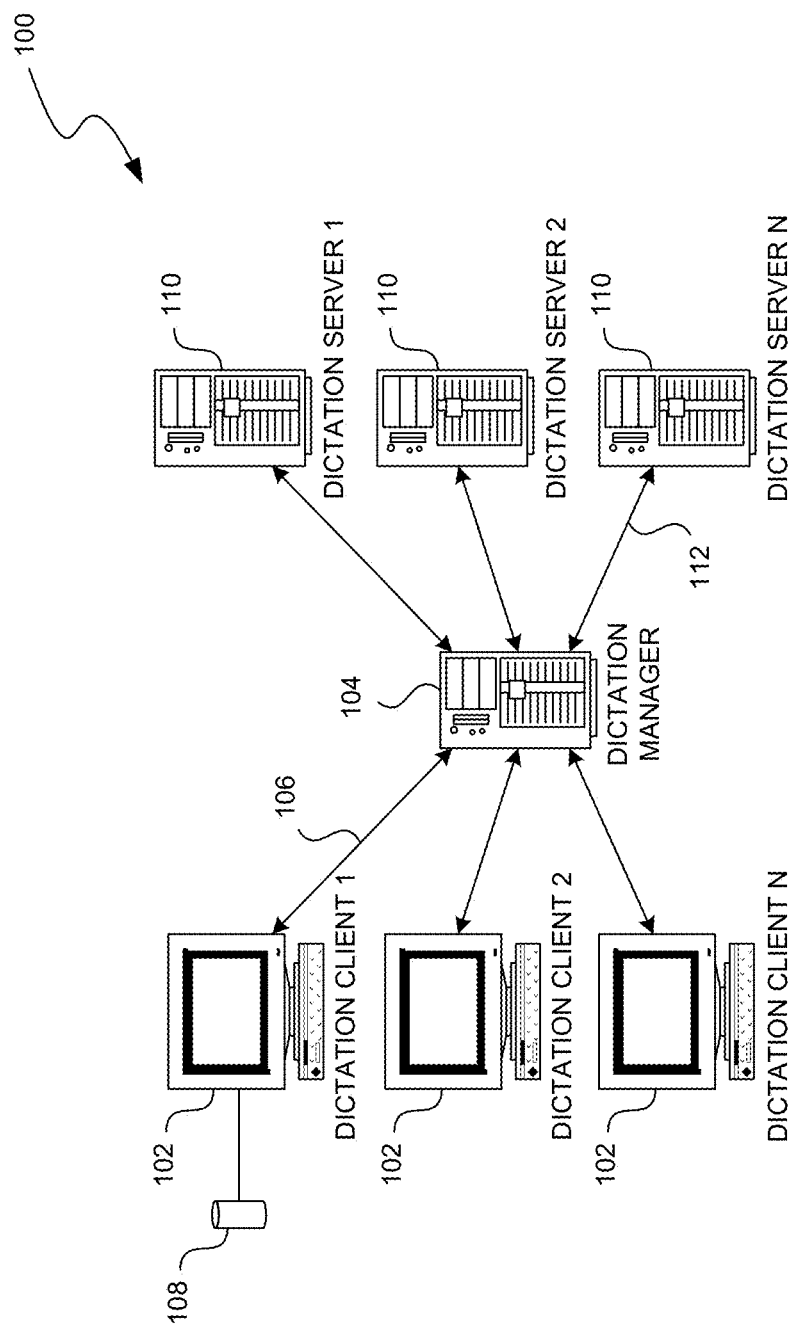
FIG. 1 is a functional block diagram of a distributed speech recognition system consistent with the technology of the present application.

The technology of the present application will now be explained with reference to the figures. While the technology of the present application is described with relation to a speech recognition system using natural language or continuous speech recognition, one of ordinary skill in the art will recognize on reading the disclosure that other configurations are possible including, for example, grammar based speech recognition engines, pattern matching speech recognition engines, other speech recognition engines and combinations thereof. Moreover, the technology of the present application will be described with reference to particular discrete processors, modules, or parts, but one of ordinary skill in the art will recognize on reading the disclosure that processors may be integrated into a single processor or server or separated into multiple processors or servers. Moreover, the technology of the present application will be described generically and portions of the present application may be loaded onto a particular user's workstation (fat or thick client) or hosted by a server that is accessed by the workstation (thin client). Moreover, the technology of the present application will be described in relation to use in conjunction with a customer relationship management (CRM) application as may be used in a call center; although, one of ordinary skill in the art on reading the disclosure would recognize the technology of the present application may be used in other fields, such as, for example, the legal field, the medical field, the accounting field, personal use, or the like. Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Conventionally, speech recognition systems may be considered isolated applications of a speech system (whether a thick or thin application). In other words, when a user invokes or launches a speech recognition application, the system loads or accesses the language model and user profile associated with the unique user identification or with that deployment of the speech recognition software, hardware, or combination thereof. A thick client application would execute the application on a local processor for a user; whereas, a thin client application would execute the application remote from the user workstation and provide, for example, an interface (typically a graphical user interface) on the workstation to allow the user to interact with the application.

When initially launched or evoked, the speech recognition engine executes the necessary applications and subroutine. These applications and subroutines allow a processor (whether local or remote) to receive an audio signal spoken by a user. Prior to, during, or subsequent to the generation of the audio signal, the speech recognition uploads a user profile for the user associated with the application. The initial, untrained speech recognition engine uploads, in this context, a generic user profile that may contain an unmodified or non-user specific language model. In some instances, the user profile may be trained while the user is learning to use the speech recognition engine. The training teaches the speech recognition engine the specific audio signal for a particular user's dialect, pronunciation, and the like. These individualized changes to the language model and the like are saved to the user profile. Thus, during the next use of the speech recognition engine, the transcription is made more accurate by the modifications to the user profile previously made.

With reference to FIG. 1, an exemplary distributed speech recognition system 100 is shown. Distributed speech recognition system 100 may provide transcription of dictation in real-time or near real-time allowing for delays associated with transmission time, processing, and the like. Of course, delay could be built into the system to allow, for example, a user to have the ability to select either real-time or batch transcription services. In this exemplary embodiment, distributed dictation system 100 includes one or more client stations 102 that are connected to a dictation manager 104 by a first network connection 106. For non-speech recognition resources, dictation manager 104 may be generically referred to as a resource manager. First network connection 106 can be any number of protocols to allow transmission of data or audio information, such as, for example, using a standard internet protocol. In certain exemplary embodiments, the first network connection 106 may be associated with a "Cloud" based network. As used herein, a Cloud based network or Cloud computing is generally the delivery of computing, processing, or the like by resources connected by a network. Typically, the network is an internet based network but could be any public or private network. The resources may include, for example, both applications and data. A conventional cloud computing system will be further explained herein below with reference to FIG. 2. With reference back to FIG. 1, client station 102 receives audio for transcription from a user via a microphone 108 or the like. While shown as a separate part, microphone 108 may be integrated into client station 102, such as, for example, a cellular phone, tablet computer, or the like. Also, while shown as a monitor with input/output interfaces or a computer station, client station 102 may be a wireless device, such as a WiFi enabled computer, a cellular telephone, a PDA, a smart phone, or the like.

Dictation manager 104 is connected to one or more dictation services hosted by dictation servers 110 by a second network connection 112. Similarly to the above, dictation servers 110 are provided in this exemplary speech recognition system, but resource servers may alternatively be provided to provide access to functionality. Second network connection 112 may be the same as first network connection 106, which may similarly be a cloud system. Dictation manager 104 and dictation server(s) 110 may be a single integrated unit connected by a bus, such as a PCI or PCI express protocol. Each dictation server 110 incorporates or accesses a natural language or continuous speech transcription engine as is generally understood in the art. In operation, the dictation manager 104 receives an audio file for transcription from a client station 102. Dictation manager 104 selects an appropriate dictation server 110, using conventional load balancing or the like, and transmits the audio file to the dictation server 110. The dictation server 110 would have a processor that uses the appropriate algorithms to transcribe the speech using a natural language or continuous speech to text processor. In most instances, the dictation manager 104 uploads a user profile to the dictation server 110. The user profile, as explained above, modifies the speech to text processor for the user's particular dialect, speech patterns, or the like based on conventional training techniques. The audio, once transcribed by the dictation server 110, is returned to the client station 102 as a transcription or data file. Alternatively, the transcription or data file may be saved for retrieval by the user at a convenient time and place.

Figure 2:
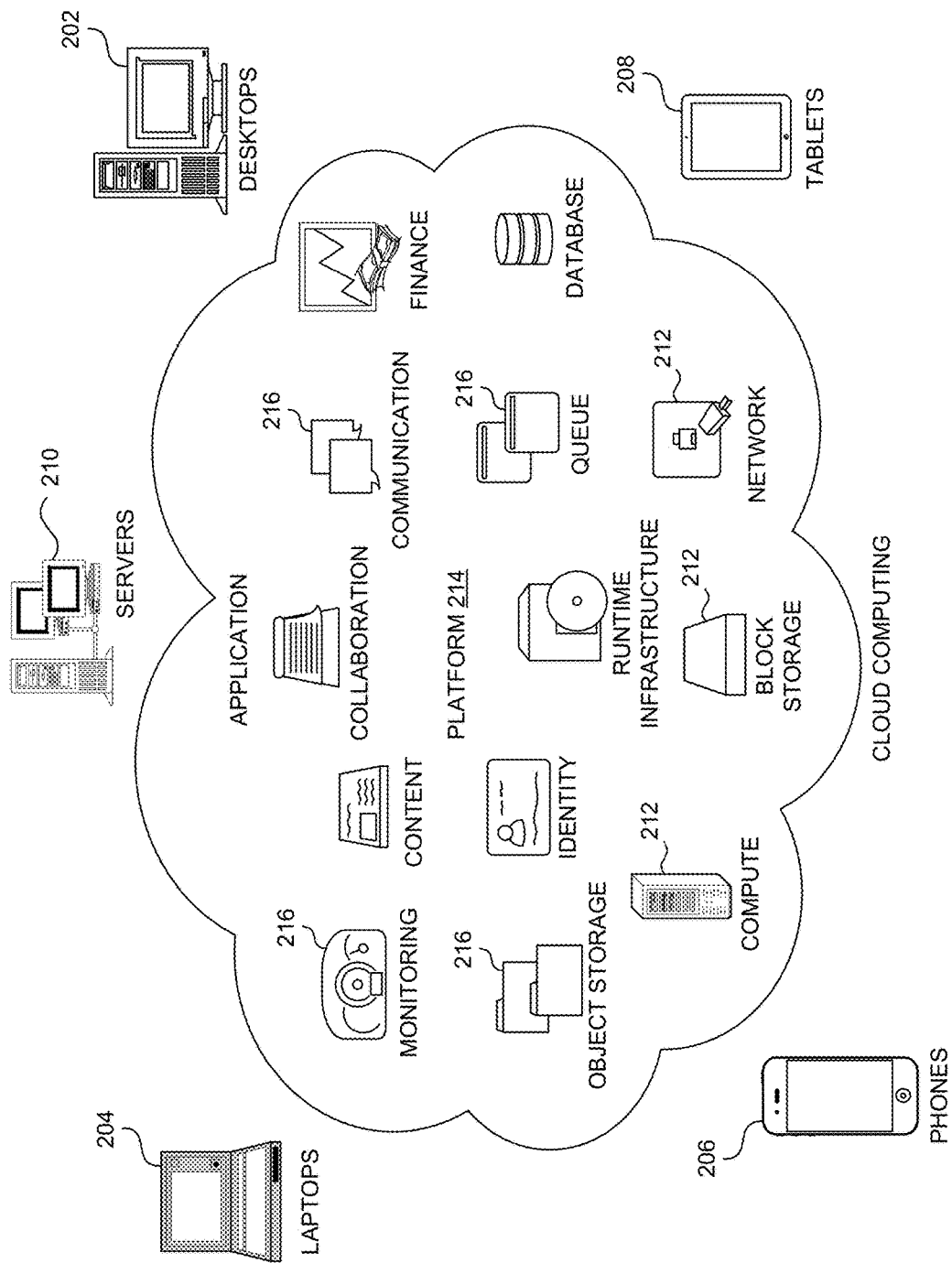
FIG. 2 is a functional block diagram of a cloud computing network consistent with the distributed speech recognition system of FIG. 1.

Referring now to FIG. 2, the basic configuration of a cloud computing system 200 will be explained for completeness. Cloud computing is generally understood in the art, and the description that follows is for furtherance of the technology of the present application. As provided above, cloud computing system 200 is arranged and configured to deliver computing and processing as a service of resources shared over a network. Clients access the Cloud using a network browser, such as, for example, Internet Explorer® from Microsoft, Inc. for internet based cloud systems. The network browser may be available on a processor, such as a desktop computer 202, a laptop computer 204 or other mobile processor such as a smart phone 206, a tablet 208, or more robust devices such as servers 210, or the like. As shown, the cloud may provide a number of different computing or processing services including infrastructure services 212, platform services 214, and software services 216. Infrastructure services 212 may include physical or virtual machines, storage devices, and network connections. Platform services may include computing platforms, operating systems, application execution environments, databases, and the like. Software services may include applications accessible through the cloud such as speech-to-text software and text-to-speech software and the like.

Figure 3:
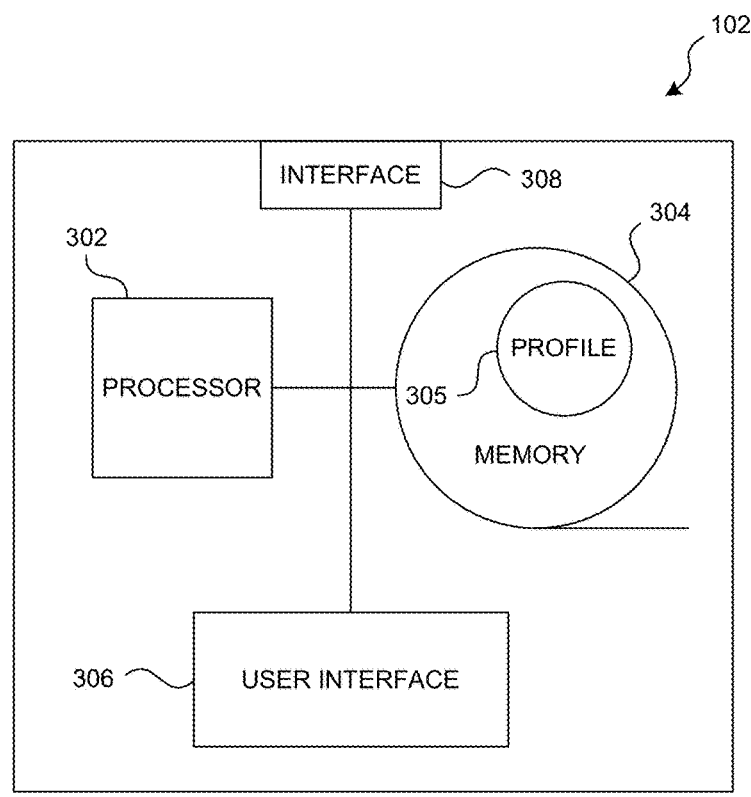
FIG. 3 is a functional block diagram of a computing device consistent with the technology of the present application.

Referring to FIG. 3, workstation 102 is shown in more detail. As mentioned above, workstation 102 may include a laptop computer, a desktop computer, a server, a mobile computing device, a handheld computer, a PDA, a cellular telephone, a smart phone, a tablet or the like. The workstation 102 includes a processor 302, such as a microprocessor, chipsets, field programmable gate array logic, or the like, that controls the major functions of the manager, such as, for example, executing a training application to evaluate the accuracy of a user's use of a speech recognition engine to reproduce true text as will be explained herein or the like. Processor 302 also processes various inputs and/or data that may be required to operate the workstation 102. Workstation 102 also includes a memory 304 that is interconnected with processor 302. Memory 304 may be remotely located or co-located with processor 302. The memory 304 stores processing instructions to be executed by processor 302. The memory 304 also may store data necessary or convenient for operation of the dictation system. For example, memory 304 may store the accuracy of a user in using the speech recognition engine to generate text as compared to the true or known text. The memory 304 may store information regarding the calculated time to train a percentage of the users and the like. A portion of memory 304 may include user profiles 305 associated with user(s) of the speech recognition engine, which may be a necessary component of a continuous speech recognition engine. The user profiles 305 also may be stored in a memory remote from the workstation and uploaded as required. The user profiles 305 may be associated with individual users by a pass code, user identification number, biometric information or the like and is usable by dictation servers 110 to facilitate the speech transcription engine in converting the audio to text. Associating users and user profiles using a database or relational memory is not further explained except in the context of the present invention. Memory 304 may be any conventional media and include either or both volatile or nonvolatile memory. Workstation 102 generally includes a user interface 306 that is interconnected with processor 302. Such user interface 306 could include speakers, microphones, visual display screens, physical input devices such as a keyboard, mouse or touch screen, track wheels, cams or special input buttons to allow a user to interact with workstation 102. Workstations have a network interface 308 (as would the dictation manager and the dictation server of this exemplary embodiment) to allow transmissions and reception of data (text, audio, or the like) between networked devices. Dictation manager 104 and dictation servers 110 may have structure similar to the workstation as described. Of course, as explained above, the various components necessary for a speech recognition system may be incorporated into a single, thick workstation 102. When incorporated into a single workstation 102, all the applications, data, and the like are locally on a machine.

Figure 4:
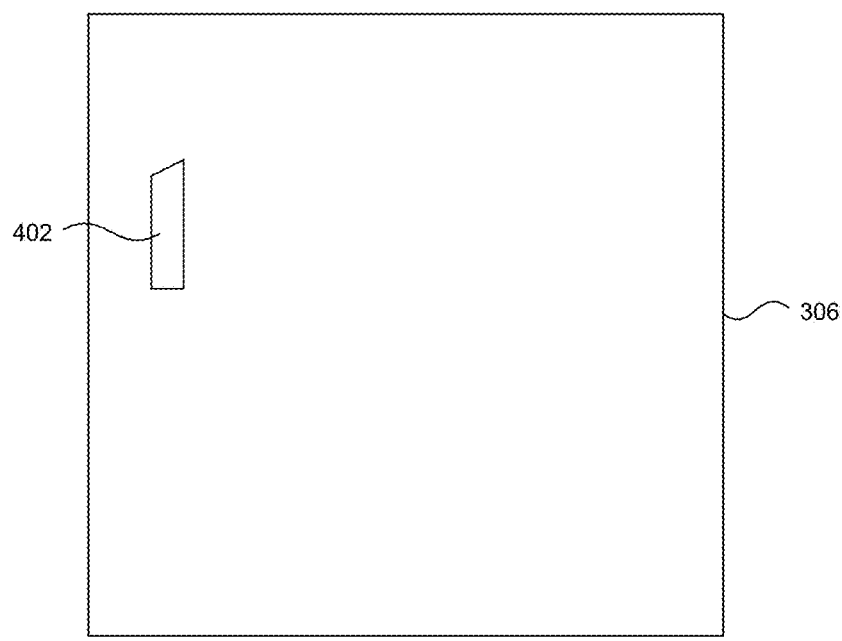
FIG. 4 is a diagram of a user interface providing control icons associated with the technology of the present application.
Figure 5:
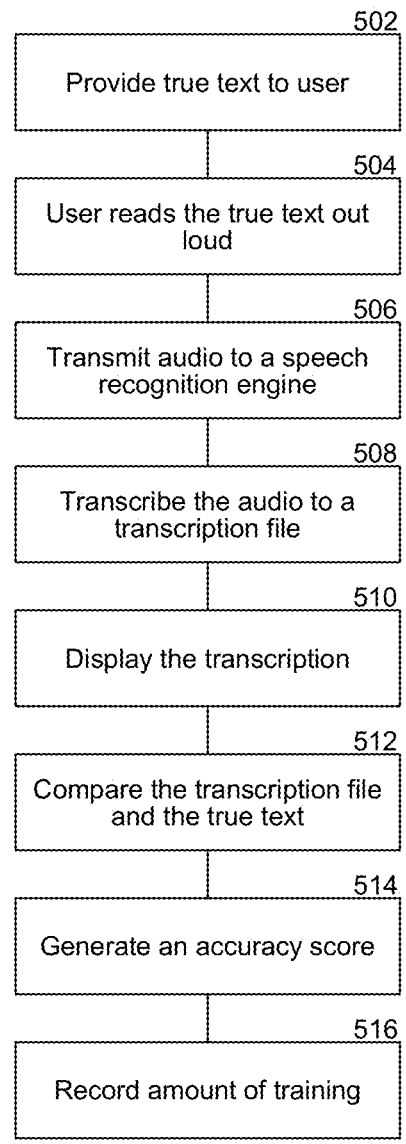
FIG. 5 is a flow chart illustrative of a methodology for obtaining historical data consistent with the technology of the present application.

As shown in FIG. 4, in certain aspects of the present technology, workstation 102 may include a user interface 306 that includes a graphical user interface. The graphical user interface may include a number of executable icons (or clickable icons) that provide information to the processor associated with the workstation. In one aspect, the interface 306 may provide a graphic 402 of user accuracy. User accuracy may be, for example, a calculation associated with the percentage of the speech recognition that is accurate. For example, with reference to FIG. 5, a training protocol may include, providing true text or known text to a user, step 502. For example, the true text may be displayed on the user interface 306. As step 504, the user reads out loud the text into a microphone that preprocesses and transmits the audio to a speech recognition engine, step 506. The speech recognition engine transcribes the audio file, which may generically be referred to as the transcribed file, step 508, which may correspondingly be displayed as, for example, a word document or data in a database field, step 510. An evaluation module would compare the transcribed file to the true text, step 512, and generate an accuracy score, step 514. The accuracy score may be based on a percentage of words that match. For example, a true text may be provided that consists of 100 words. The transcribed file would be compared to the true text and if the transcribed file matched the true text exactly, the accuracy score may be 100%. Correctly matching 90 of the 100 words would provide an accuracy score of 90%, etc. Other measures of accuracy may be devised. The evaluation module may compare the transcribed file to the true text in real time, near-real time, or subsequent to completion of the transcribed file. The evaluation module may transmit a signal for display indicative of the accuracy. For example, if the true text is: "Evaluate whether the speech recognition engine correctly transcribed the audio," then the user would read the true text. The speech recognition may transcribe the text as: "Evaluate weather the speech recognition engine correctly transcribed the audio." If the evaluation module operates in real or near real time, the accuracy score display may initially register 100% as "evaluate: is transcribed correctly. However, on the transcription of "weather" for "whether", the accuracy score would change to 50%. Finally, as the remainder of the true text is transcribed, the accuracy score increases to the final 90% in this exemplary embodiment. A timing module may record the total amount of time any particular training exercise took, step 516.

The number of training tasks, the time recorded for the training tasks, and the accuracy score are stored in a memory, such as, for example, memory 304, for each user. The information stored in memory may be generically referred to as historical data. A resource calculation module can compile for all the users the average time, the average amount of tasks, a combination thereof, or the like, of plurality of users to reach or achieve a particular accuracy score. Using this metric, a company may be able to estimate the time, training tasks, a combination thereof, or the like for any new employee, for example, to achieve the required level of accuracy. For positions with a known or predictable attrition rate, the company may be able to estimate the number of individuals needed in training at any particular moment to compensate for the known or predictable replacement of employees. In one exemplary methodology, the resource calculation module may determine the average resources by summing the time to achieve a predetermined accuracy score for each user in the database and dividing the predetermined accuracy score by the number of users. Moreover, the average resource calculation may be completed in real time as new information becomes available, such as a new user achieving the desired accuracy score. Alternatively, the resource calculation module may determine the average resources by using a median time for a user to achieve a predetermined accuracy score.

The resource calculation module also may track the average time for any incremental increase in the accuracy score. For example, the average or median time or training for a user to increase the accuracy from 82% to 87% may be X amount of time or Y amount of training. Using the metric, an employer, for example, may monitor not only when an employee has achieved a particular accuracy score, but also whether an employee is making adequate progress in the training. In certain instances, not making adequate progress in training may allow for early intervention, which may have cost savings.

The processor may set a flag in a user's profile or in the associated storage database compiling the information when a new user exceeds the expected time to achieve a desired accuracy score or when the user is not making adequate progress towards the accuracy score. When, for example, the desired accuracy score is AB % and the average time of training for a new user to achieve an accuracy score of AB %, the processor may monitor a user's accuracy score and time in training. When the desired accuracy score of AB % is not achieved in the average time, such as, for example, C hours of training, then a flag may be set indicative that the user requires additional assistance. Instead of a flag, the information may be provided to a supervisor or the like via an email, an SMS, a telephone call, a pre-recorded message, or the like.

Figure 6:
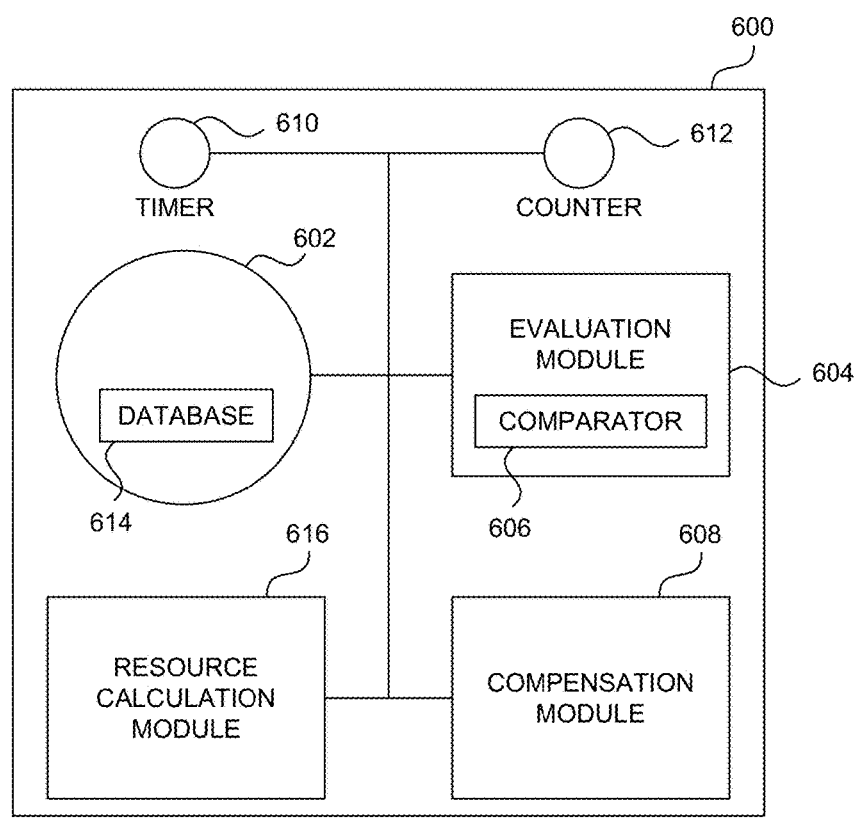
FIG. 6 is a functional block diagram of a processor consistent with the technology of the present application.
Figure 7:
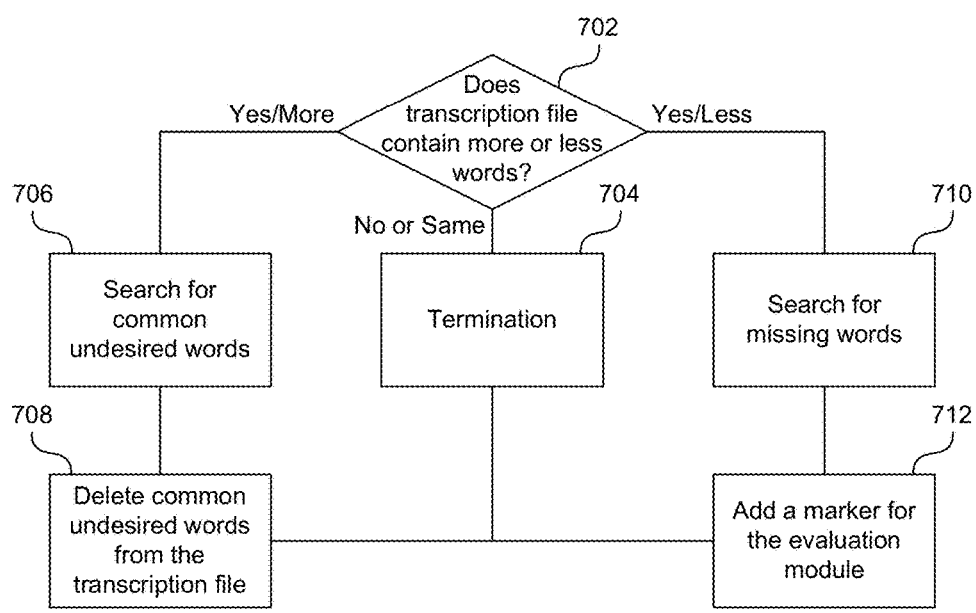
FIG. 7 is a flow chart illustrative of a methodology for compensating for omissions and inclusions in the transcription file consistent with the technology of the present application.

FIG. 6 shows a functional block diagram of a processor 600 consistent with the technology of the present application. The processor 600 is interconnected to a memory 602 and contains a number of modules or applications to control the major functions of the processor 600. The code for the modules or applications may be stored in memory 602 and accessible by processor 600. Alternatively, the code, instructions, and data for the processor may be stored remotely. The processor 600 may be incorporated into workstation 102, dictation manager 104, or otherwise remote or local to the above described system. The processor 600 may include, for example, an evaluation module 604. The evaluation module 604 may receive data from a memory, which may be memory 602, relating to the transcription file and the true text. The evaluation module 604 may use a comparator 606, or the like, to compare the data in the transcription file and the true text to determine whether the transcription file and the true text match. As audio frequently has pauses or repetition, the evaluation module also may include a compensation module 608. The compensation module may filter the transcription file to delete artifacts of speech, such as the transcription of certain phrases, for example, "ummm" and the like. Alternatively, the compensation module 608 may adjust the transcription file for added words or deleted words from the transcription file that may artificially depress the accuracy. Referring back to the true text example above: "Evaluate whether the speech recognition engine correctly transcribed the audio," may be compared to a transcription file containing: "Evaluate the speech recognition engine correctly transcribed the audio," which is potentially indicative of poor reading rather than accuracy. A straight comparison may result in everything after "evaluate" being considered incorrect. The compensation module, however, would compensate for the missing word "whether" and properly evaluate the accuracy score. Referring to FIG. 7, a flow chart 700 is provided illustrative of a methodology of how a compensation module may compensate for inclusion or exclusion of words from the transcription. First, the compensation module may determine whether the transcription file contains more or less words than the true text file, step 702. If it is determined that the transcription file contains the same number of words as the true text, the process may end as it is assumed the transcription file does not have inclusion or exclusion of words, step 704. Next, the compensation module may search the transcription file for common phrases that are uttered during speech, but not typically a desired part of a transcript, step 706. Common phrases may include phrases, such as, for example, "umm" or the like typically made as the individual struggles with the next word. Other common phrases may include repetitive phrases or stutters such as reading a word twice or partial words. On a determination that common undesired phrases are contained in the transcription file, the compensation module may delete or otherwise remove the words from the transcription file prior to evaluation, step 708. The compensation module may next search the transcription file for missing words, step 710. If it is determined a word is missing, the compensation module may insert a "blank" or default word into the transcription file, or a corresponding equivalent marker so the evaluation module can correctly identify the accuracy of the remainder of the transcription file, step 712. In the exemplary transcription file above: "Evaluate the speech recognition engine correctly transcribed the audio," the compensation module may determine a word is missing between "evaluate" and "the." The compensation module may insert a blank or a tag such that the evaluation module can correctly determine the accuracy of the remaining transcription file.

The processor 600 further may include a timer 610 and a counter 612. The timer 610 may record the total training time; whereas, the counter 612 may increment for each training exercise. The evaluation module 604, timer 610, and or counter 612 may populate fields, such as accuracy, time, and number of training classes in a database 614 regarding the training of a user. A resource calculation module 616 may access the information to generate reports and the like regarding resource management as explained above.

Using the above, it is possible to generate statistics on how long it takes users to reach the acceptable threshold on accuracy and, similarly, what percentage of users have succeeded by a given time or amount of training. An organization may plan on how much time or resources to allocate for training on the speech recognition engine. In other words, a class that is X minutes in length will yield Y trained users for a class size of Z. Z-Y users will require additional training.

Figure 8:
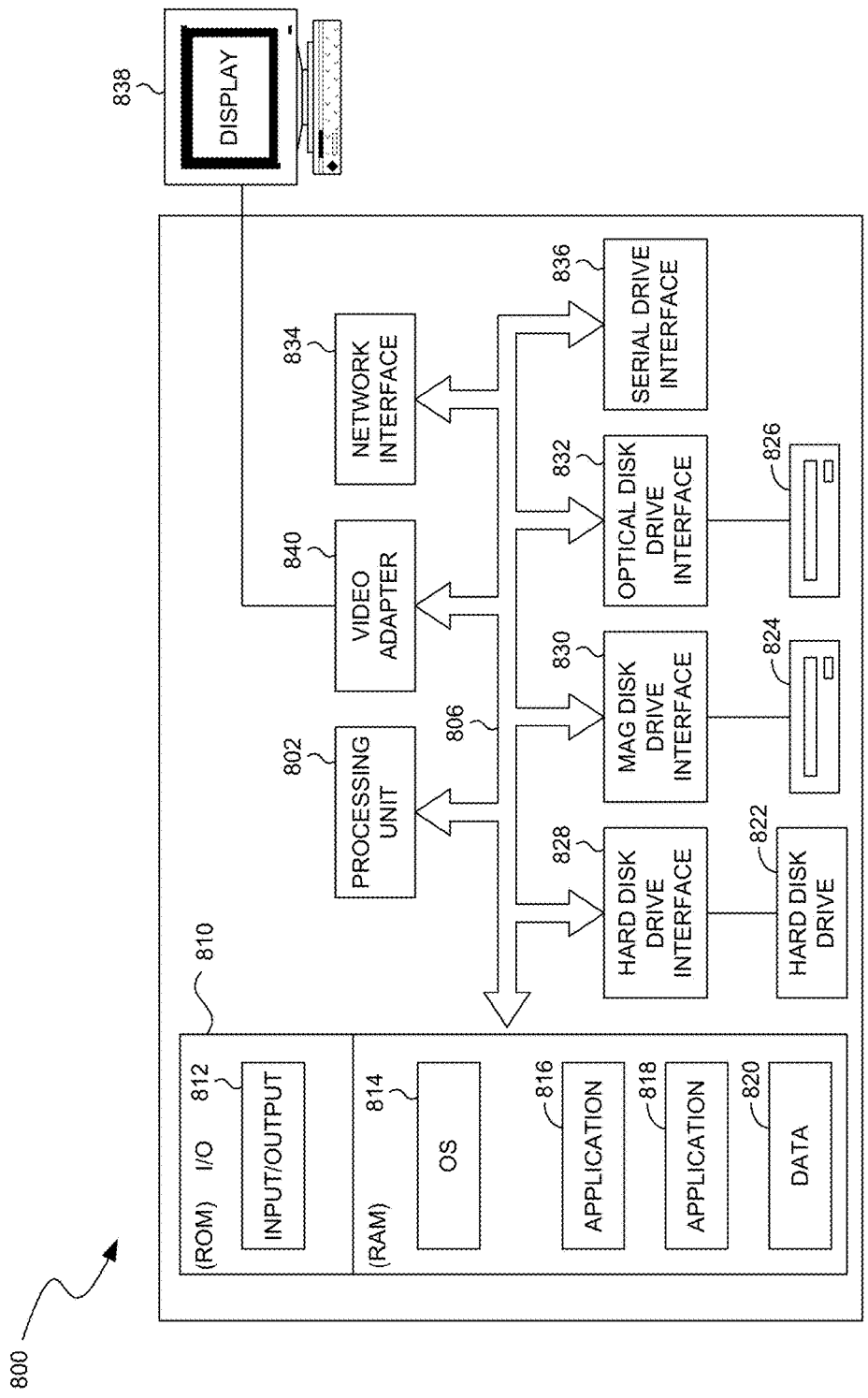
FIG. 8 is functional block diagram of a computer consistent with the technology of the present application.

Referring now to FIG. 8, a functional block diagram of a typical workstation 800 for the technology of the present application is provided. Workstation 800 is shown as a single, contained unit, such as, for example, a desktop, laptop, handheld, or mobile processor, but workstation 700 may comprise portions that are remote and connectable via network connection such as via a LAN, a WAN, a WLAN, a WiFi Network, Internet, or the like. Generally, workstation 800 includes a processor 802, a system memory 804, and a system bus 806. System bus 806 couples the various system components and allows data and control signals to be exchanged between the components. System bus 806 could operate on any number of conventional bus protocols. System memory 804 generally comprises both a random access memory (RAM) 808 and a read only memory (ROM) 810. ROM 810 generally stores a basic operating information system such as a basic input/output system (BIOS) 812. RAM 808 often contains the basic operating system (OS) 814, application software 816 and 818, and data 820. System memory 804 contains the code for executing the functions and processing the data as described herein to allow the present technology of the present application to function as described. Workstation 800 generally includes one or more of a hard disk drive 822 (which also includes flash drives, solid state drives, etc., as well as other volatile and non-volatile memory configurations), a magnetic disk drive 824, or an optical disk drive 826. The drives also may include flash drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown). Workstation 800 has network connection 834 to connect to a local area network (LAN), a wireless network, an Ethernet, the Internet, or the like, as well as one or more serial port interfaces 836 to connect to peripherals, such as a mouse, keyboard, modem, or printer. Workstation 700 also may have USB ports or wireless components, not shown. Workstation 800 typically has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method performed on at least one processor for determining training time for a new user to achieve a predetermined accuracy score, the method comprising the steps of:

performing one or more training exercises for each of a plurality of users of a speech recognition engine, wherein the one or more training exercises comprise the steps of:
transmitting known text to each of the plurality of users;
receiving at least one audio file from each of the plurality of users, wherein the at least one audio file from each of the plurality of users corresponds to the known text;
transcribing each of the at least one audio file from each of the plurality of users using the speech recognition engine to generate at least one transcribed audio file;
correcting each of the at least one transcribed audio file using the known text transmitted to each of the plurality of users; and
based at least in part on the corrections, determining an accuracy score for each of the at least one transcribed audio file based at least in part on the corrections associated with each of the plurality of users;
storing historical training data associated with the plurality of users, wherein the historical training data includes a first set of data indicative of an amount of time for the training exercises performed with each user, a second set of data indicative of a number of training exercises performed with each user, and a third set of data indicative of the accuracy score associated with each user;
based at least in part on the stored historical training data, calculating, based at least in part on the stored historical training data, an estimated amount of time for the speech recognition engine to achieve a predetermined accuracy score for a new user,
estimating, by the at least one processor, an attrition rate of current employees that use the speech recognition engine; and
determining, by the at least one processor, a hiring window for at least one new employee, wherein the hiring window is in advance of attrition of at least one current employee and is based at least in part on the estimate of the amount of time for the speech recognition engine to achieve the predetermined accuracy score, such that the speech recognition engine is estimated to achieve the predetermined accuracy score for the new employee prior to a departure of the at least one current employee.

* * * * *